United States Patent
Wylin

(10) Patent No.: US 6,422,300 B1
(45) Date of Patent: Jul. 23, 2002

(54) APPARATUS FOR CONTROLLING THE TEMPERATURE OF A BEVERAGE WITHIN A MOTOR VEHICLE

(75) Inventor: James P. Wylin, Waterford, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/467,857

(22) Filed: Dec. 20, 1999

(51) Int. Cl.[7] .............. B60N 3/10; B60H 3/06; B60H 1/32; F25D 11/00; A47K 1/08
(52) U.S. Cl. .......... 165/41; 165/80.1; 165/42; 165/43; 62/244; 248/311.2; 224/926; 219/433; 219/436
(58) Field of Search ............ 165/41, 43, 42, 165/80.1; 219/433, 436; 248/311.2; 62/244; 224/926

(56) References Cited

U.S. PATENT DOCUMENTS

| | | | | |
|---|---|---|---|---|
| 1,442,910 A | * | 1/1923 | Steinhardt | 219/436 |
| 4,320,723 A | | 3/1982 | Wendling et al. | 123/41.12 |
| 4,546,237 A | | 10/1985 | Collins | 219/331 |
| 4,708,386 A | | 11/1987 | Moore et al. | 296/37.8 |
| 4,712,823 A | | 12/1987 | Mills et al. | 296/37.8 |
| 4,892,138 A | * | 1/1990 | Bibik, Jr. | 165/41 |
| 4,927,108 A | | 5/1990 | Blazic et al. | 248/311.2 |
| 4,981,277 A | | 1/1991 | Elwell | 248/311.2 |
| 5,024,411 A | | 6/1991 | Elwell | 248/311.2 |
| 5,037,162 A | | 8/1991 | Ransom | 312/223 |
| 5,165,646 A | * | 11/1992 | Gewecke | 62/244 |
| 5,289,962 A | | 3/1994 | Tull et al. | 224/273 |
| 5,440,972 A | | 8/1995 | English | 99/282 |
| 5,494,249 A | | 2/1996 | Ozark et al. | 248/311.2 |
| 5,540,409 A | * | 7/1996 | Cunningham | 248/311.2 |
| 5,588,480 A | * | 12/1996 | Armanno, Sr. | 165/80.1 |
| 5,639,052 A | | 6/1997 | Sauve | 248/311.2 |
| 5,697,587 A | | 12/1997 | Israel | 248/214 |
| 5,788,324 A | | 8/1998 | Shea et al. | 297/113 |
| 5,913,452 A | * | 6/1999 | Weigl | 248/311.2 |
| 6,082,114 A | * | 7/2000 | Leonoff | 62/371 |
| 6,140,614 A | * | 10/2000 | Padamsee | 219/438 |

FOREIGN PATENT DOCUMENTS

| | | | |
|---|---|---|---|
| JP | 5-272836 | * | 10/1993 |
| JP | 7-16139 | * | 1/1995 |
| JP | 7-179121 | * | 7/1995 |
| JP | 8-67197 | * | 3/1996 |
| JP | 9-20167 | * | 1/1997 |
| JP | 9-324972 | * | 12/1997 |
| JP | 10-278571 | * | 10/1998 |
| JP | 2000-108755 | * | 4/2000 |
| JP | 2000-231667 | * | 8/2000 |

* cited by examiner

Primary Examiner—John K. Ford
(74) Attorney, Agent, or Firm—Ralph E. Smith

(57) ABSTRACT

An apparatus for controlling the temperature of a beverage includes a cupholder portion. The cupholder portion defines a cylindrical opening for receiving a beverage container. The apparatus additionally includes a cooling arrangement for delivering a source of cooled air to the generally cylindrical opening. The apparatus further includes a heating arrangement for delivering a source of heat to the generally cylindrical opening.

2 Claims, 2 Drawing Sheets

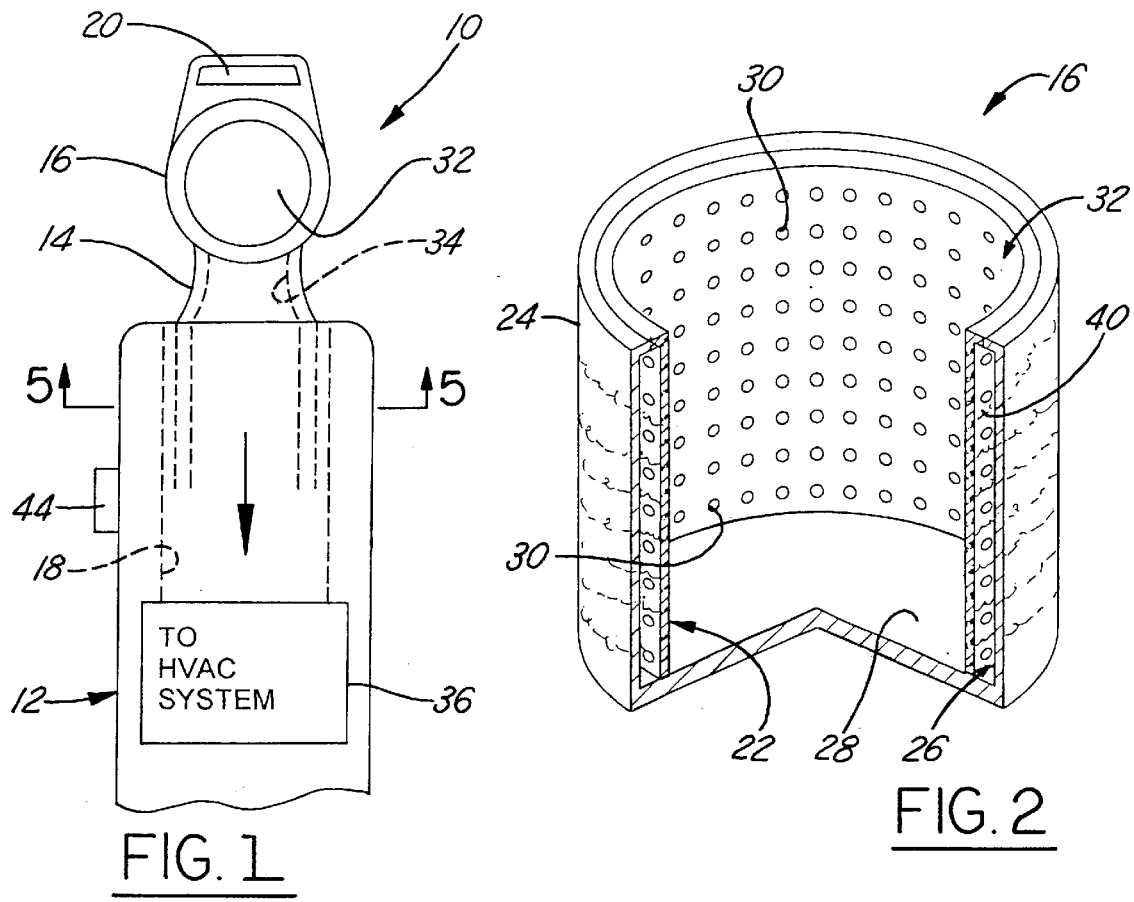
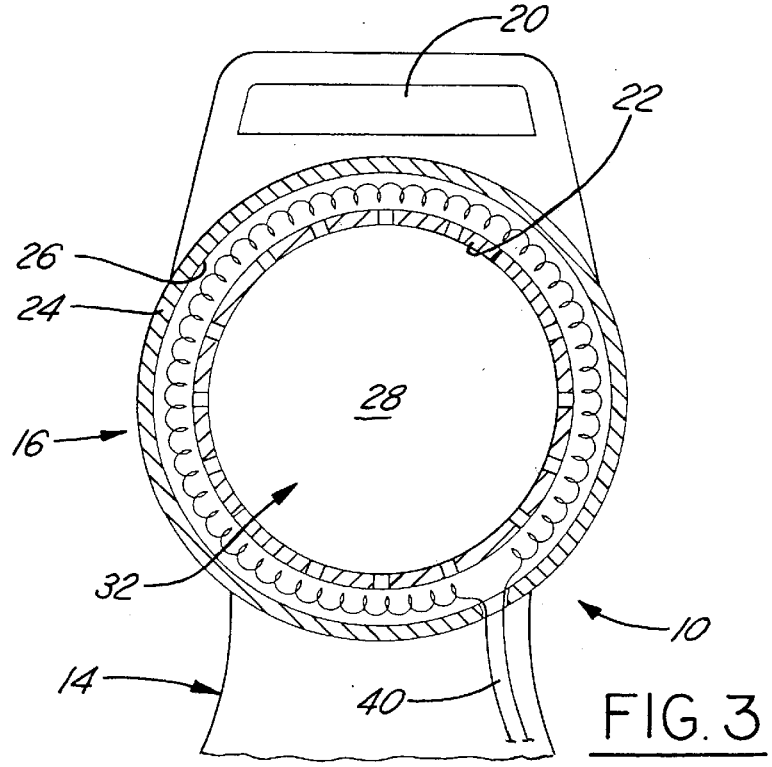

APPARATUS FOR CONTROLLING THE TEMPERATURE OF A BEVERAGE WITHIN A MOTOR VEHICLE

BACKGROUND OF THE INVENTION

1. Technical Field

The present invention generally pertains to motor vehicles. More particularly, the present invention pertains to a cupholder for supporting a beverage within a motor vehicle passenger compartment. More specifically, but without restriction to the particular embodiment and/or use which is shown and described for purposes of illustration, the present invention relates to a cupholder for a motor vehicle which controls the temperature of a beverage.

2. Discussion

Beverage containers, including but not limited to coffee mugs, bottles, cans and paper cups, are available in a wide range of sizes and are often transported within the interior of vehicles for the convenience of the occupants. By the nature of their generally upright and cylindrical constructions, beverage containers are not sufficiently stable to functionally withstand the jostling encountered during normal motor vehicle travel unless physically held or otherwise appropriately secured. Because it is often desirable to set aside a beverage container during the course of a vehicular trip, the containers are often precariously placed on the floor or other surface where they are likely to be upset.

A number of devices for stabilizing containers within vehicles have been heretofore developed. Such devices include fold-down seatback portions formed to include static cup-holding recesses such as that shown in commonly assigned U.S. Pat. No. 5,788,324. Such devices also include dynamic structures deployable from dashboards and armrests which adjustably receive multiple beverage containers. One example of such a dynamic device is shown and described in commonly assigned U.S. Pat. No. 4,981,277.

To a more limited extent, cup holding arrangements have been heretofore proposed for either heating or cooling a beverage. For example, U.S. Pat. No. 5,697,587 discloses a holding device for positioning a beverage container adjacent an air conditioning outlet within an automotive vehicle to obtain a cooling effect. The device includes a cup holder for holding a beverage container and a grip for connecting to the air conditioner grill. U.S. Pat. No. 5,037,162 discloses an adjustable truck utility tray having heated cupholders. The tray mounts on a vertically telescoping stand and has horizontally adjustable and swiveling brackets. While these and other patents may generally address a need for either heating or cooling a beverage within a motor vehicle, significant room for improvement exists.

SUMMARY OF THE INVENTION

It is a general object of the present invention to provide a cupholder for temperature controlling a beverage.

It is another object of the present invention cupholder for selectively heating or cooling a beverage.

In one form, the present invention provides an apparatus for controlling the temperature of a beverage. The apparatus includes a cupholder portion defining a generally cylindrical opening for receiving a beverage container. The apparatus additionally includes a cooling arrangement for delivering a source of cooled air to the generally cylindrical opening. The apparatus further includes a heating arrangement for delivering a source of heat to the generally cylindrical opening.

In another form, the present invention provides an apparatus for controlling the temperature of a beverage. The apparatus includes a cupholder portion defining a generally cylindrical opening for receiving a beverage container. The apparatus additionally includes a cooling arrangement for delivering a source of cooled air to the generally cylindrical opening. The cooling arrangement is configured to introduce the source of cooled air into the generally cylindrical opening in a radial direction from a plurality of points spaced about the periphery of the generally cylindrical opening.

In yet another form, the present invention provides an apparatus for controlling the temperature of a beverage. The apparatus includes a cupholder portion defining a generally cylindrical opening for receiving a beverage container. The apparatus additionally includes a heating arrangement for delivering a source of heat to the generally cylindrical opening. The heating arrangement is configured to introduce the source of heat into the generally cylindrical opening in a radial direction.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is a top view of an apparatus for supporting a beverage container constructed in accordance with the teachings of a preferred embodiment of the present invention, the apparatus shown operatively associated with an armrest.

FIG. 2 is a partially cut-away perspective view of a cupholder portion of the apparatus of FIG. 1.

FIG. 3 is a simplified cross-sectional view taken horizontally through the apparatus of the present invention.

DETAILED DESCRIPTION OF THE PREFERRED EMBODIMENT

Figure 4:
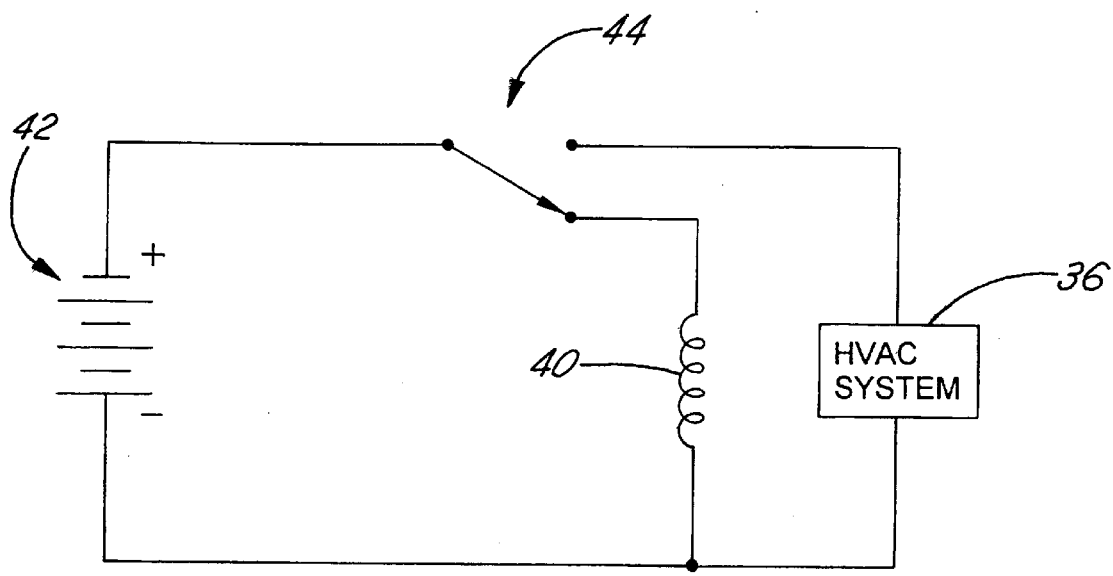
FIG. 4 schematically illustrates a circuit for selectively directing one of a source of heat and a source of cooling air to the cupholder portion of the apparatus of the present invention.
Figure 5:
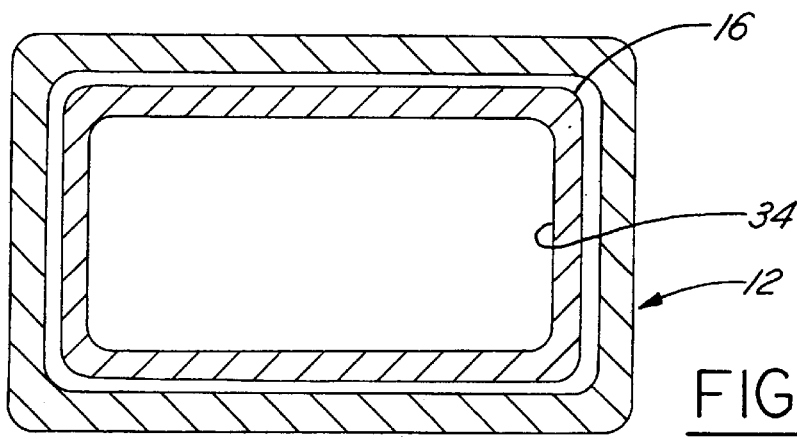
FIG. 5 is a cross-sectional view taken along the line 5—5 of FIG. 1.

With initial reference to FIG. 1, an apparatus for controlling the temperature of a beverage within a motor vehicle is generally identified at reference numeral 10. The apparatus 10 is shown operatively associated with an armrest 12. The teachings of the present invention are not intended to be limited to the particular application illustrated in the drawings. In this regard, it will be understood by those skilled in the art that the teachings of the present invention have application to a wide variety of dynamic devices (e.g., those deployable from a dash, an armrest, or the like).

In the particular embodiment illustrated, the apparatus 10 is shown to include a carrier 14 and a cupholder portion 16. The carrier 14 and cupholder portion 16 are linearly translatable between a first position or deployed position (as shown in FIG. 1) and a second position or stored position (not shown). In the stored position, the carrier 14 and cupholder portion 16 are disposed within a chamber 18 defined by the armrest 12. The carrier 14 defines a handle 20 which may be manually grasped.

With continued reference to FIG. 1 and additional reference to FIGS. 2 through 4, the construction and operation of the apparatus 10 of the present invention will be detailed.

The cupholder portion 16 is illustrated to include an inner cylindrical wall 22 and an outer cylindrical wall 24. The inner and outer cylindrical walls 22 and 24 are concentrically arranged and radially spaced apart to define a cylindrical cavity 26. The outer cylindrical wall 24 is integrally formed with a bottom wall 28 which serves to directly support the beverage container (not shown). In one embodiment, the outer cylindrical wall 24 and the bottom wall 28 are constructed of a plastic material. Alternatively, it will be understood that other materials which would insulate the vehicle occupants from heat can be incorporated.

The inner cylindrical wall 22 is preferably constructed of metal or other suitable material capable of transferring heat to the beverage container. In the embodiment illustrated, the inner cylindrical wall 22 is formed to include a plurality of holes 30. The plurality of holes 30 are aligned in row and columns. The rows circumferentially surround the generally cylindrical opening 32. The columns extend substantially the entire height of the cupholder portion 16. An inner diameter of the inner cylindrical wall 22 defines a generally cylindrical opening 32 for receiving the beverage container. The plurality of holes 30 provide fluid communication between the generally cylindrical opening 32 and the cylindrical cavity 26.

The apparatus 10 of the present invention further includes a cooling arrangement for delivering a source of cooled air to the generally cylindrical opening 32. The cooling arrangement defines a fluid path between an HVAC system 36 of the vehicle and the cylindrical opening 32. The cooling arrangement includes an air duct or channel 34 which longitudinally extends through the carrier member 14. The channel 34 is in fluid communication with the cylindrical cavity 26 of the cupholder portion 16. The cylindrical cavity 26 is also in fluid communication with the vehicle HVAC system 36. In this manner, a source of cooled air can be delivered from the HVAC system 36 through the channel 34 of the carrier 14 and to the cylindrical cavity 26. The cooling arrangement is configured to introduce the source of cooled air into the cylindrical opening 32 in a radial direction from the plurality of holes 30. The plurality of holes 30 provide points spaced about the entire periphery of the generally cylindrical opening 32. In addition, the plurality of holes 30 will be positioned along a substantial axial portion of the beverage container. In this manner, the source of cooled air can radially surround a substantial portion of the beverage container to facilitate efficient cooling of a contained beverage.

The apparatus 10 of the present invention further includes a heating arrangement for delivering a source of heat to the generally cylindrical opening 32. As will become understood below, the heating arrangement is configured to introduce the source of heat into the generally cylindrical opening 32 in a radial direction. This is distinct from a heating plate which would deliver heat to a beverage through a lower support surface.

The heating arrangement is shown to include a heating coil 40 which is disposed within the cylindrical cavity 26 of the cupholder portion 16. The heating coil 40 circumferentially extends about the inner cylindrical wall 22. In the embodiment illustrated, the heating coil 40 is wrapped multiple times around the inner cylindrical wall 22 in a spiral fashion. When energized, the heating coil 40 radiates heat which passes radially into the cylindrical chamber through the plurality of holes 30 and also raises the temperature of the metallic inner cylindrical wall 22. As will be discussed below, the heating coil is interconnected to the vehicle battery 42 in a known manner. It will be understood that the apparatus 10 of the present invention may supplementally or alternatively deliver a source of heated air from the HVAC system 36 through the channel 34 and into the cylindrical cavity 26.

In the embodiment illustrated, the heating and cooling of the apparatus 10 is controlled through a switch 44 disposed on the armrest 12. In a middle position, the apparatus 10 is not powered to deliver either heat or a source of cooled air to the cylindrical opening cavity 32. The switch is movable to a first position (e.g., forward) and a second position (e.g., rearward). In the first position, the heating coil 40 is energized through connection with the vehicle battery 42. This is shown schematically in FIG. 4. In the second position, an HVAC system vent is powered from the battery 42 to open and deliver the source of cooled air to the cylindrical opening.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for controlling the temperature of a beverage within a motor vehicle, the apparatus comprising:

a cupholder portion defining a generally cylindrical opening for receiving a beverage container, the cupholder portion including an inner cylindrical wall and an outer cylindrical wall spaced apart to define a cylindrical cavity therebetween, wherein the inner cylindrical wall includes a plurality of holes defining a corresponding plurality of fluid paths between the cylindrical cavity and the cylindrical opening;

a cooling arrangement for delivering cooled air to the generally cylindrical opening, the cooling arrangement defining a fluid path between an HVAC system of the motor vehicle and the generally cylindrical opening; and a heating arrangement having a heating coil circumferentially surrounding the generally cylindrical opening for delivering heat to the generally cylindrical opening.

2. The apparatus of claim 1, further including a carrier, the cupholder portion connected to the carrier, the carder and the cupholder portion jointly movable between a stored position and a deployed position.

* * * * *